United States Patent [19]
Madison et al.

[11] Patent Number: 6,008,621
[45] Date of Patent: Dec. 28, 1999

[54] PORTABLE COMPUTER CHARGING SYSTEM AND STORAGE CART

[75] Inventors: Gregory P. Madison, Story, Wyo.; Theodore M. Schneider, Orwigsburg, Pa.

[73] Assignee: Electronic Classroom Furniture Systems, Story, Wyo.

[21] Appl. No.: 09/172,824

[22] Filed: Oct. 15, 1998

[51] Int. Cl.⁶ .................................................. H02J 7/00
[52] U.S. Cl. ........................................ 320/107; 320/111
[58] Field of Search .................................. 320/107, 111, 320/105

[56] References Cited

U.S. PATENT DOCUMENTS

| | | | |
|---|---|---|---|
| 2,375,866 | 5/1945 | Nelms et al. | 320/107 |
| 2,479,705 | 8/1949 | True | 320/107 |
| 2,483,673 | 10/1949 | Robinson et al. | 320/107 |
| 4,161,682 | 7/1979 | Corvette | 320/107 |
| 5,039,929 | 8/1991 | Veistroffer et al. | 320/107 |

*Primary Examiner*—Peter S. Wong
*Assistant Examiner*—Gregory J. Toatley, Jr.

[57] ABSTRACT

The present invention provides, for use with a portable computer having a battery coupled to an electrical connector that is connectable to a charging cable, a battery charging system, comprising: (a) a cabinet having a power distribution compartment, a storage compartment, and a cable raceway connecting the power distribution and storage compartments; (b) a storage bay located within the storage compartment adapted to receive a portable computer therein; (c) an electrical power distribution system located within the power distribution compartment and electrically connectable to the charging cable; and (d) a cable grommet located adjacent the storage bay and configured to receive and hold the charging cable in a relatively fixed position with respect to the storage bay.

26 Claims, 2 Drawing Sheets

PORTABLE COMPUTER CHARGING SYSTEM AND STORAGE CART

TECHNICAL FIELD OF THE INVENTION

The present invention is directed, in general, to battery charging systems and, more specifically, to a portable computer battery charging system and mobile storage cart.

BACKGROUND OF THE INVENTION

The ubiquity of personal computers in recent years has led to their introduction as part of the curriculum in both primary and secondary schools across the nation. Originally, the size and cost of personal computers led school systems to establish centralized computer laboratories in much the same way colleges provided centralized calculator laboratories in the 1950's and 1960's. Students would be scheduled for a computer literacy course and would physically present themselves to the computer lab. There, students would share the computers as time allowed.

As laptop computers became more powerful and less costly, schools realized that full size computers were no longer required for computer literacy courses. Therefore, school focus shifted from the centralized computer laboratory to providing a limited number of laptop/portable computers that could be shared among the students. These laptop computers could be moved from classroom to classroom at the appropriate time. This change of focus provided several benefits: (a) a dedicated computer laboratory was no longer required, (b) physical space occupied by the same number of computers was significantly reduced, (c) extensive power distribution systems for a multitude of computer terminals and peripherals in a computer laboratory were eliminated, and (d) student learning time was maximized. However, now 20 to 30 laptop computers must be transported from one classroom to another. Thus, mobile cabinets were developed to provide a convenient means of storing and transporting a significant number of laptop computers.

Initial entries into the laptop computer cabinet market were primarily mobile storage cabinets with a number of bins to provide a means of safely storing and transporting 20 to 30 laptop computers. In this instance, the computer batteries would be charged at a central station. Later versions were poorly designed by providing a single computer storage compartment on the lower shelf of the cart with access along one side that required a teacher to bend over sufficiently to retrieve a computer. Electrical power to charge the computer batteries was routed from a power strip located on an upper shelf with the power converter-to-computer cables randomly routed to the computer storage compartment. As each computer manufacturer desires to limit the use of their own power converter to their own brand of computer, the converter-to-computer connector plug varies considerably between brands, and even within brands, to assure that only the correct voltage and amperage are provided to a given computer. With from 20 to 30 computers in one cabinet, the maze of wires from the power converters to the computers has created a significant problem in matching the appropriate power converter with its computer.

Accordingly, what is needed in the art is a mobile storage and charging system for a multitude of portable computers that simplifies matching the computer with its appropriate power converter.

SUMMARY OF THE INVENTION

To address the above-discussed deficiencies of the prior art, the present invention provides, for use with a portable computer having a battery coupled to an electrical connector that is connectable to a charging cable, a battery charging system, comprising: (a) a cabinet having a power distribution compartment, a storage compartment, and a cable raceway connecting the power distribution and storage compartments; (b) a storage bay located within the storage compartment adapted to receive a portable computer therein; (c) an electrical power distribution system located within the power distribution compartment and electrically connectable to the charging cable; and (d) a cable grommet located adjacent the storage bay and configured to receive and hold the charging cable in a relatively fixed position with respect to the storage bay.

In one embodiment, the storage compartment includes a dividing wall that divides the storage compartment into at least first and second storage compartments. In another embodiment, the dividing wall has a passage formed there through that is open to the atmosphere and in fluid connection with the power distribution compartment, thereby to vent heat generated within the power distribution compartment to the atmosphere. In another aspect, the cable raceway is a flue open to the atmosphere and in fluid connection with the power distribution compartment, thereby venting heat generated within the power distribution compartment to the atmosphere.

In a further aspect of the present invention, the cabinet further comprises a plurality of wheels, that are configured to support the cabinet on a surface and enable the cabinet to be rolled upon the surface. In an alternative embodiment, the storage bay comprises a plurality of storage bays and the cable grommet comprises a plurality of cable grommets, each of the plurality of cable grommets located adjacent one of the plurality of storage bays.

In another embodiment, the electrical power distribution system includes an electrical power strip having a plurality of electrical outlets and at power cable. In a further aspect of this embodiment, the plurality of electrical outlets is coupleable to the charging cable.

Another embodiment of the present invention comprises a storage cabinet door that forms a top of the cabinet and a temporary work surface. In an alternative embodiment the grommet comprises a flexible diaphragm having multiple cuneiform sections disposed radially about a central aperture. Yet another alternative embodiment includes a power cable aperture formed in an exterior wall of the power distribution compartment. The power cable aperture is configured to allow a power cable to be passed there through and exterior to the cabinet. In another aspect of the present invention, the power distribution compartment further includes a power cable aperture. In yet another embodiment, the cabinet further includes a power cable storage bracket positioned exterior to the power distribution compartment. In an alternative embodiment, the power distribution compartment includes ventilation apertures formed in an exterior wall thereof. The ventilation apertures are configured to allow air to flow into the power distribution compartment.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
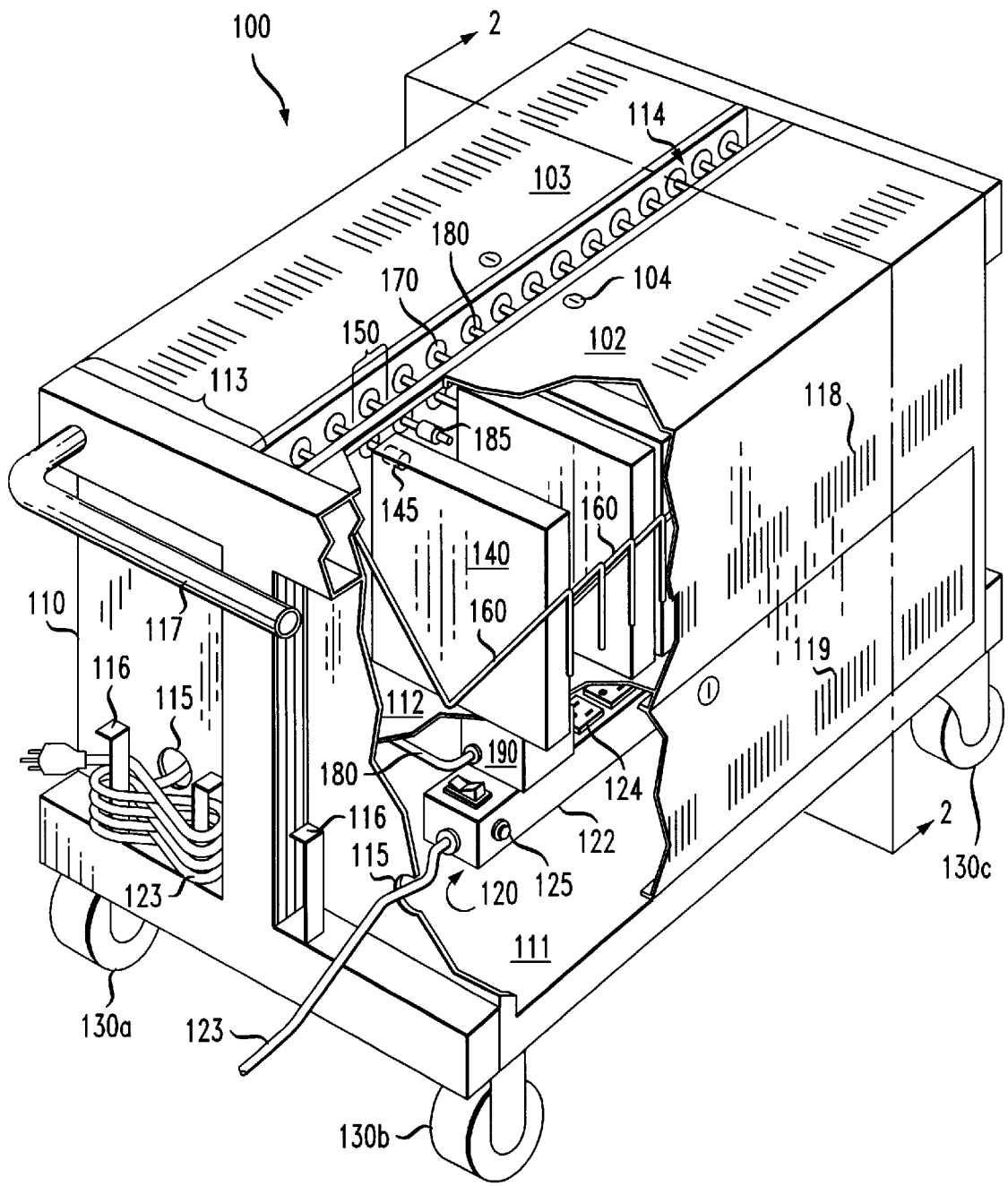
FIG. 1 illustrates a cutaway isometric view of one embodiment of a mobile laptop computer battery charging system constructed according to the principles of the present invention.

Referring initially to FIG. 1, illustrated is a cutaway isometric view of one embodiment of a mobile laptop computer battery charging system constructed according to the principles of the present invention. A mobile laptop computer battery charging system, generally designated 100, comprises a cabinet 110, an electrical power distribution system 120, and a set of wheels, collectively designated 130. The cabinet 110 includes a power distribution compartment 111, first and second computer storage compartments 112, 113, and a cable raceway 114. The cable raceway 114 connects the power distribution compartment 111, and the first and second computer storage compartments 112, 113.

In the illustrated embodiment, the electrical power distribution system 120, located within the power distribution compartment 111, comprises a first ac power strip 122 and a second ac power strip (not visible) with power cables 123 and multiple ac outlets 124. The power strip 122 may also incorporate a resettable surge protection circuit 125. The power cable apertures 115 accommodate routing power cables 123 of the power strips 122 outside the cabinet 110, where the power cables 123 may be connected to a commercial ac power outlet (not shown). When not in use, the power cables 123 may be stowed on cable storage brackets 116. The set of wheels 130 includes a pair of fixed wheels 130a, 130b, at an end of the cabinet 110 equipped with a push/pull handle 117, and a pair of castered wheels 130c, and 130d (not visible) at the opposite end of the cabinet 110. The wheels 130 enable the cabinet 110 to be rolled across a floor from one classroom to another.

In the illustrated embodiment, the first and second computer storage compartments 112, 113 are disposed above the power distribution compartment 111, and separated by the cable raceway 114. The cable raceway 114 forms a duct from inner walls of each of the first and second storage compartments 112, 113. The cable raceway 114 is open at the top to form a flue, drawing heat from the power distribution compartment 111 by convection. In one embodiment, ventilation of the first and second storage compartments 112, 113 is achieved through ventilation louvers 118, while ventilation of the power distribution compartment 111 may be achieved through ventilation louvers 119. Although the illustrated embodiment shows a cable raceway 114 between two computer storage compartments 112, 113, other configurations, e.g., a cable raceway disposed along a side of a single storage compartment, are also envisioned by the present invention.

The cabinet 110 further comprises upper cabinet doors 102, 103 that function to secure portable computers 140 by a thumb latch 104. In an alternative embodiment, the thumb latch 104 may be replaced by a lock for added security. The upper cabinet doors 102, 103 also provide a horizontal surface upon which a portable computer 140 may be temporarily placed for checkout. The first and second storage compartments 112, 113 further comprise a plurality of storage bays 150 created by a plurality of dividers 160 removably affixed to walls of the storage compartments 112, 113. The plurality of storage bays 150 is shown partially populated with a plurality of portable computers 140. A plurality of cable grommets 170 is installed in inner walls of the first and second storage compartments 112, 113. The cable grommets 170 are aligned with corresponding storage bays 150 to accept a mating connector 185 of a charging cable 180 electrically coupled to a power converter 190. One who is skilled in the art is familiar with portable computers 140 that comprise a battery connector 145 for charging.

Figure 2:
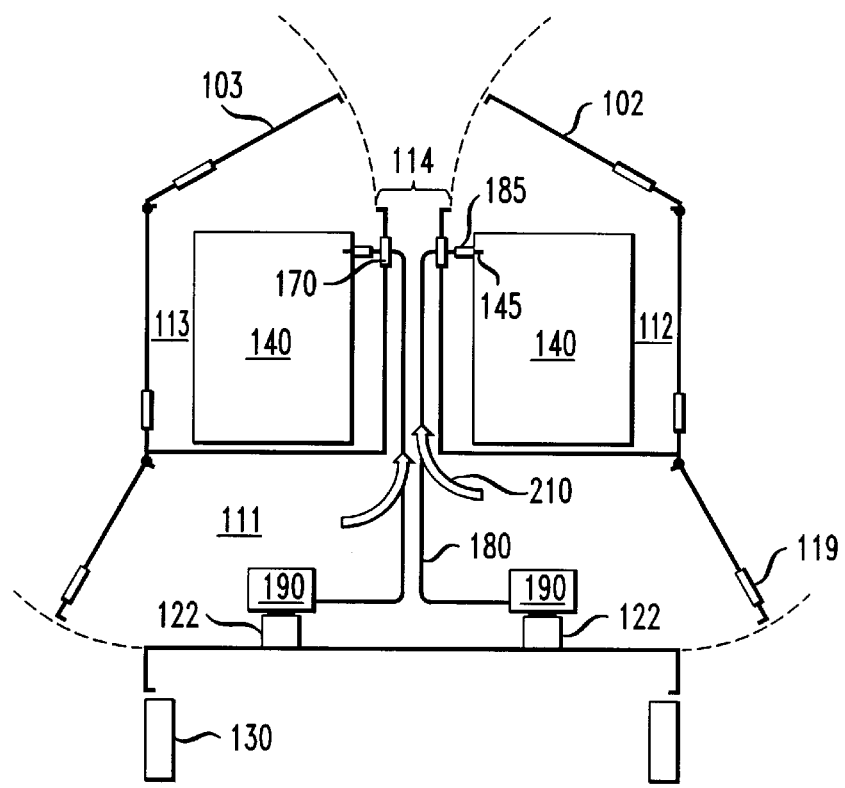
FIG. 2 illustrates a cross-sectional view of the mobile laptop computer battery charging system of FIG. 1 along plane 2—2.

Referring now to FIG. 2, illustrated is a cross-sectional view of the mobile laptop computer battery charging system of FIG. 1 along plane 2—2. In this view, the two power strips 122 in the power distribution compartment 111 are clearly shown relative to the storage compartments 112, 113 that receive portable computers 140. The mating cable connector 185 of the power converter 190 is shown coupled to the battery connector 145 of the portable computer 140. The charging cable 180 is routed from the power distribution compartment 111, through the cable raceway 114, and through the cable grommet 170. As can be clearly seen, the structured location of the cable grommets 170, and matching power converters 190 permit an orderly routing of charging cables 180 from the power distribution compartment 111 to the storage compartments 112, 113. Also evident in this view is the cable raceway's 114 open top as the raceway 114 forms a duct connecting the power distribution compartment 111 to the outside of the cabinet, creating a flue for dissipation of heat from the power distribution compartment 111. Air flow enters the power distribution compartment through vents 119 and exits through the raceway 114. Convection currents are shown at arrows 210.

Figure 3:
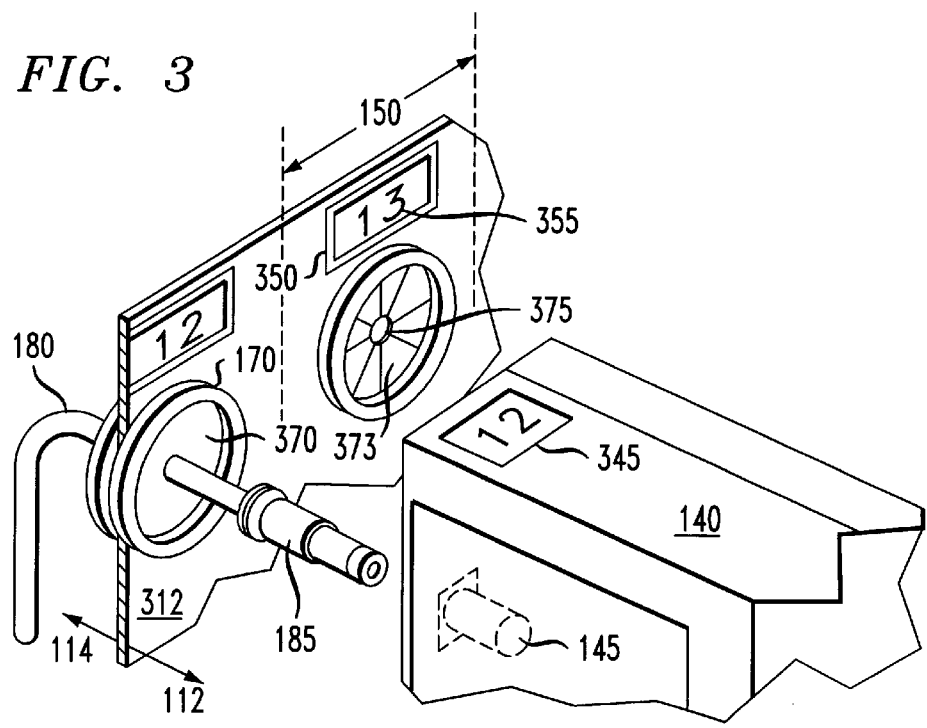
FIG. 3 illustrates a closeup isometric view of the grommet and connectors of FIG. 1.

Referring now to FIG. 3 with continuing reference to FIG. 2, illustrated is a closeup isometric view of the grommet and connectors of FIG. 1. The cable grommet 170 is configured with a flexible diaphragm 370 having multiple cuneiform sections 373 disposed radially about a central aperture 375 to permit the mating cable connector 185 and a portion of the charging cable 180 to be fed through a single grommet 170. As shown, the grommet 170 is located in a wall 312 of the storage compartment 112 to protect and restrain the charging cable 180. In one embodiment, the cuneiform sections 373 constrict about the cable 180 and prevent the mating cable connector 185 from falling back into the cable raceway 114 and then into the power distribution compartment 111. In an alternative embodiment, the flexible diaphragm 370 may be made of a single membrane that constricts about the cable 180. With the charging cables 180 retained in the cable grommets 170, a mating cable connector 185 is always near at hand to a specific storage bay 150 and the matching battery connector 145.

In an alternative embodiment, each storage bay 150 may be equipped with a label holder 350 that permits matching a particular storage bay 150 with a specific portable computer 140. In one instance, the label holder 350 may identify a make and model of computer that mates with the installed power converter 190 and its mating cable connector 185. Alternatively, each storage bay 150 and its matching computer 140 may be labeled with a bay number 355, making locating and installing the computer 140 possessing a matching number 345 reliable and highly resistant to error.

While the foregoing description has addressed a battery charging system and cart for a plurality of laptop computers, one who is skilled in the art will readily recognize that the principles of the present invention are similarly applicable to personal digital assistants, palm top computers, sub-notebooks, etc.

Although the present invention has been described in detail, those skilled in the art should understand that they can make various changes, substitutions and alterations herein without departing from the spirit and scope of the invention in its broadest form.

What is claimed is:

1. For use with a portable computer having a battery coupled to an electrical connector that is connectable to a charging cable, a battery charging system, comprising:
    a cabinet having a power distribution compartment, a storage compartment, and a cable raceway connecting said power distribution and storage compartments;
    a storage bay located within said storage compartment adapted to receive a portable computer therein;
    an electrical power distribution system located within said power distribution compartment and electrically connectable to said charging cable; and
    a cable grommet located adjacent said storage bay and configured to receive and hold said charging cable in a relatively fixed position with respect to said storage bay.

2. The battery charging system of claim 1 wherein said storage compartment includes a dividing wall that divides said storage compartment into at least first and second storage compartments.

3. The battery charging system of claim 2 wherein said dividing wall has a passage formed there through that is open to the atmosphere and in fluid connection with said power distribution compartment, thereby to vent heat generated within said power distribution compartment to the atmosphere.

4. The battery charging system of claim 1 wherein said cable raceway is a flue open to the atmosphere and in fluid connection with said power distribution compartment, thereby to vent heat generated within said power distribution compartment to the atmosphere.

5. The battery charging system of claim 1 wherein said cabinet further comprises a plurality of wheels, said plurality of wheels configured to support said cabinet on a surface and enable said cabinet to be rolled upon said surface.

6. The battery charging system of claim 1 further comprising a plurality of storage bays and a plurality of cable grommets, each of said plurality of cable grommets located adjacent one of said plurality of storage bays.

7. The battery charging system of claim 1 wherein said electrical power distribution system includes an electrical power strip having a plurality of electrical outlets and a power cable.

8. The battery charging system of claim 7 wherein each of said plurality of electrical outlets is coupleable to said charging cable.

9. The battery charging system of claim 1 wherein said storage compartment further comprises a storage cabinet door, said storage cabinet door forming a top of said cabinet and a temporary work surface.

10. The battery charging system of claim 1 wherein said grommet comprises a flexible diaphragm having multiple cuneiform sections disposed radially about a central aperture.

11. The battery charging system of claim 1 wherein said power distribution compartment further includes a power cable aperture formed in an exterior wall of said power distribution compartment, said power cable aperture configured to allow a power cable to be passed therethrough and exterior to said cabinet.

12. The battery charging system of claim 11 wherein said cabinet further comprises a power cable storage bracket positioned exterior to said power distribution compartment.

13. The battery charging system of claim 1 wherein said power distribution compartment includes ventilation apertures formed in an exterior wall thereof and configured to allow air to flow into said power distribution compartment.

14. A method of manufacturing a battery charging system for portable computers, comprising:
    forming a cabinet having a power distribution compartment, a storage compartment, and a cable raceway connecting said power distribution and storage compartments;
    forming a storage bay within said storage compartment adapted to receive a portable computer therein;
    installing an electrical power distribution system within said power distribution compartment; and
    installing a cable grommet adjacent said storage bay and configuring said cable grommet to receive and hold a charging cable in a relatively fixed position with respect to said storage bay.

15. The method as recited in claim 14 wherein forming a cabinet includes forming a dividing wall that divides said storage compartment into at least first and second storage compartments.

16. The method as recited in claim 15 wherein forming said dividing wall includes forming a duct that is open to the atmosphere and in fluid connection with said power distribution compartment, thereby to vent heat generated within said power distribution compartment to the atmosphere.

17. The method as recited in claim 14 wherein forming said cable raceway includes forming a flue open to the atmosphere and in fluid connection with said power distribution compartment, thereby to vent heat generated within said power distribution compartment to the atmosphere.

18. The method as recited in claim 14 wherein forming said cabinet further comprises installing a plurality of wheels configured to support said cabinet on a surface and enable said cabinet to be rolled upon said surface.

19. The method as recited in claim 14 wherein forming a storage bay further comprises forming a plurality of storage bays, and installing a cable grommet further comprises installing a plurality of cable grommets, each of said plurality of cable grommets located adjacent one of said plurality of storage bays.

20. The method as recited in claim 14 wherein installing an electrical power distribution system includes installing an electrical power strip having a plurality of electrical outlets and a power cable.

21. The method as recited in claim 14 wherein forming a cabinet further comprises forming a storage cabinet door, said storage cabinet door forming a top of said cabinet and a temporary work surface.

22. The method as recited in claim 14 wherein forming a storage bay includes forming a plurality of storage bays, said forming a plurality of storage bays including installing a plurality of removable dividers in said storage compartment.

23. The method as recited in claim 14 wherein installing a cable grommet includes installing a cable grommet comprising a flexible diaphragm having multiple cuneiform sections disposed radially about a central aperture.

24. The method as recited in claim 14 wherein forming a cabinet further includes forming a power cable aperture in an exterior wall of said power distribution compartment, said power cable aperture configured to allow a power cable to be passed there through and exterior to said cabinet.

25. The method as recited in claim 14 wherein forming a cabinet further comprises installing a power cable storage bracket positioned exterior to said power distribution compartment.

26. The method as recited in claim 14 wherein forming a cabinet includes forming ventilation apertures in an exterior wall thereof, said ventilation apertures configured to allow air to flow into said power distribution compartment.

* * * * *